(12) United States Patent
Milas

(10) Patent No.: US 8,601,562 B2
(45) Date of Patent: Dec. 3, 2013

(54) POLICY ENFORCEMENT USING ESSO

(75) Inventor: Brian T. Milas, Belmont, MA (US)

(73) Assignee: Courion Corporation, Framingham, MA (US)

( * ) Notice: Subject to any disclaimer, the term of this patent is extended or adjusted under 35 U.S.C. 154(b) by 835 days.

(21) Appl. No.: 12/331,898

(22) Filed: Dec. 10, 2008

(65) Prior Publication Data

US 2009/0205016 A1    Aug. 13, 2009

Related U.S. Application Data

(60) Provisional application No. 61/012,581, filed on Dec. 10, 2007.

(51) Int. Cl.
*G06F 7/04* (2006.01)
*G06F 9/00* (2006.01)
*H04L 29/06* (2006.01)
*H04L 9/32* (2006.01)

(52) U.S. Cl.
USPC .......... 726/8; 726/2; 726/10; 726/14; 726/27; 713/152; 713/155; 713/156; 713/164; 713/168

(58) Field of Classification Search
USPC ............ 726/1, 2, 8, 10, 14, 27; 713/152, 155, 713/156, 164, 168
See application file for complete search history.

(56) References Cited

U.S. PATENT DOCUMENTS

| | | | |
|---|---|---|---|
| 5,748,890 A | 5/1998 | Goldberg et al. | 395/188.01 |
| 5,944,824 A * | 8/1999 | He | 726/6 |
| 6,044,464 A | 3/2000 | Shamir | 713/186 |
| 6,055,637 A | 4/2000 | Hudson et al. | 713/201 |
| 6,065,120 A | 5/2000 | Laursen et al. | 713/201 |
| 6,092,199 A | 7/2000 | Dutcher et al. | 713/201 |
| 6,144,959 A | 11/2000 | Anderson et al. | 707/9 |
| 6,158,010 A * | 12/2000 | Moriconi et al. | 726/1 |
| 6,233,608 B1 | 5/2001 | Laursen et al. | 709/217 |
| 6,269,405 B1 | 7/2001 | Dutcher et al. | 709/248 |
| 6,339,830 B1 | 1/2002 | See et al. | 713/202 |
| 6,345,361 B1 | 2/2002 | Jerger et al. | 713/200 |
| 6,427,209 B1 | 7/2002 | Brezak, Jr. et al. | 713/201 |
| 6,615,350 B1 | 9/2003 | Schell et al. | 713/168 |
| 6,662,187 B2 | 12/2003 | Barnett et al. | 707/101 |
| 6,757,720 B1 | 6/2004 | Weschler, Jr. | 709/220 |
| 6,971,014 B1 | 11/2005 | Hagmeier et al. | 713/182 |
| 7,085,834 B2 | 8/2006 | Delany et al. | 709/225 |

(Continued)

FOREIGN PATENT DOCUMENTS

EP    1 241 858 A2    9/2002
WO    WO 02/061653 A2    8/2002

OTHER PUBLICATIONS

International Search Report and the Written Opinion for PCT/US08/86244, mailed Feb. 2, 2009.

*Primary Examiner* — Mohammad W Reza
(74) *Attorney, Agent, or Firm* — Mintz Levin Cohn Ferris Glovsky and Popeo, P.C.

(57) ABSTRACT

A method for enforcing policies used with a computer client, the method including receiving, at policy decision point (PDP) processor, information from a single sign-on (SSO) system indicating an occurrence of an event of interest on the computer client, performing, using the PDP processor, a policy check in response to the occurrence of the event of interest, wherein a policy check result is generated, and providing the generated policy check result to the SSO system.

30 Claims, 6 Drawing Sheets

(56) References Cited

U.S. PATENT DOCUMENTS

| | | | |
|---|---|---|---|
| 7,107,441 B2 | 9/2006 | Zimmer et al. | 713/1 |
| 7,131,000 B2 | 10/2006 | Bradee | 713/164 |
| 7,136,903 B1 | 11/2006 | Phillips et al. | 709/217 |
| 7,260,838 B2 * | 8/2007 | Bones et al. | 726/8 |
| 7,269,853 B1 * | 9/2007 | Dunn | 726/27 |
| 7,325,128 B2 * | 1/2008 | Wood et al. | 713/155 |
| 7,412,720 B1 | 8/2008 | Frey et al. | 726/8 |
| 7,415,607 B2 | 8/2008 | Sinn | 713/158 |
| 7,434,257 B2 | 10/2008 | Garg et al. | |
| 7,451,301 B2 | 11/2008 | Zimmer et al. | 713/1 |
| 7,496,954 B1 * | 2/2009 | Himawan et al. | 726/8 |
| 8,069,476 B2 * | 11/2011 | Kinser et al. | 726/8 |
| 2002/0073305 A1 | 6/2002 | Joseph et al. | 713/1 |
| 2002/0091745 A1 | 7/2002 | Ramamurthy et al. | 709/100 |
| 2002/0107920 A1 | 8/2002 | Hotti | 709/204 |
| 2002/0120868 A1 | 8/2002 | Hay | 713/201 |
| 2002/0144119 A1 * | 10/2002 | Benantar | 713/171 |
| 2002/0147801 A1 | 10/2002 | Gullotta et al. | 709/223 |
| 2002/0156904 A1 | 10/2002 | Gullotta et al. | 709/229 |
| 2003/0023880 A1 | 1/2003 | Edwards et al. | 713/201 |
| 2003/0105654 A1 | 6/2003 | MacLeod et al. | 705/7 |
| 2003/0126137 A1 | 7/2003 | McFadden | |
| 2006/0041666 A1 * | 2/2006 | Karremans | 709/229 |
| 2006/0136986 A1 | 6/2006 | Doolittle | 726/1 |
| 2006/0161783 A1 | 7/2006 | Aiken et al. | 713/182 |
| 2007/0156694 A1 | 7/2007 | Lim | 707/9 |
| 2007/0234410 A1 * | 10/2007 | Geller | 726/8 |
| 2007/0277231 A1 | 11/2007 | Medvinsky et al. | 726/5 |
| 2008/0276308 A1 * | 11/2008 | Graser et al. | 726/6 |

\* cited by examiner

POLICY ENFORCEMENT USING ESSO

CROSS-REFERENCE TO RELATED ACTIONS

This application claims priority to and the benefit of U.S. Provisional Application No. 61/012,581 filed Dec. 10, 2007, which is incorporated by reference herein in its entirety.

BACKGROUND

Compliance regulations and general security concerns typically drive the need for businesses to enforce security policies across many computerized systems. This sector of the market is often referred to as Governance, Risk, and Compliance (GRC). Typically, part of GRC is ensuring that desired and/or required security policies are defined and enforced such that the desired workers have minimal and sufficient access to perform assigned tasks. Separation of Duty (SoD), also referred to as Segregation of Duty, is an example of one such policy. SoD typically refers to the policies, procedures, and organizational structure that help ensure that one person cannot independently control all key aspects of a process or computer-related operation and thereby conduct unauthorized actions and/or gain unauthorized access to assets or records without detection.

SoD policy enforcement can be used to prevent fraud and abuse by a single person. For example, SoD can help avoid fraud by preventing a single person from being assigned or being able to control some or all of the systems needed to commit fraud. A common example is that one person should not be able to both accept a loan application and approve a loan application. Having both of these rights could give a single person the opportunity to commit fraud by granting phony loans without any oversight. Typically, through the use of SoD policies, systems can be periodically checked for policy violations (e.g., conflicts in access rights).

Separation of Duty policies can vary, and can be enforced at different times. For example, Static SoD policies are typically enforced at the time access to an application is assigned, and Dynamic SoD (DSD) policies are typically enforced at the time the assigned rights are used. Traditional approaches to DSD enforcement require modification of the applications or systems where the DSD policy is to be enforced.

SUMMARY

In general, in an aspect, the invention provides a method for enforcing policies used with a computer client, the method including receiving, at policy decision point (PDP) processor, information from a single sign-on (SSO) system indicating an occurrence of an event of interest on the computer client, performing, using the PDP processor, a policy check in response to the occurrence of the event of interest, wherein a policy check result is generated, and providing the generated policy check result to the SSO system.

Implementations of the invention may provide one or more of the following features. Performing the policy check includes performing a separation of duty policy check. The separation of duty policy check is a dynamic separation of duty policy check. The event of interest is selected from the group consisting of launching a computer application, logging onto the computer application, attempting to start the computer application, accessing a webpage, and accessing a remote server. The SSO system is an enterprise single sign-on system. The method further includes limiting access to a computer application until the policy check result is generated.

Implementations of the invention may also provide one or more of the following features. The method further includes limiting access to a computer application as a function of the policy check result. The method further includes automating a logon process of a computer application as a function of the policy check result. The method further includes at least one of preventing access to a computer application, and shutting down the computer application as a function of the policy check result. The method further includes receiving, at the PDP processor, information relating to events of interest on a plurality of computer clients. The events of interest are selected from the group consisting of attempting access to a computer application, accessing the computer application, shutting down of the computer application, and logging off of the computer application.

Implementations of the invention may further provide one or more of the following features. The method further includes preventing access to a computer application running on a first computer client in response to a computer application running on a second computer client. The method further includes storing the policy check result in a log file. The method further includes maintaining a list of active computer applications based upon the information received from the SSO system. The list of active computer applications relates to a plurality of computer clients. The performing the policy check is performed using the list of active computer applications. The method further includes updating the list of active computer applications in response to at least one of a shutdown event and a logoff event.

In general, in another aspect, the invention provides a policy enforcement system for use with a computer client configured to execute computer applications, the system including a single sign-on (SSO) system configured to monitor the computer client for an occurrence of an event of interest, a policy decision point (PDP) processor in communication with the SSO system and configured to receive from the SSO system an indication of the occurrence of the event of interest, perform a policy check in response to the occurrence of the event of interest, provide a policy check result to the SSO system, and wherein the SSO system is further configured to manage the computer application as a function of the policy check result.

Implementations of the invention may provide one or more of the following features. The PDP processor is configured to perform a separation of duty policy check. The separation of duty policy check is a dynamic separation of duty policy check. The event of interest is selected from the group consisting of launching a computer application, logging onto the computer application, attempting to start the computer application, accessing a webpage, and accessing a remote server. The SSO system is configured as an enterprise single sign-on system. The SSO system is configured to limit access to the computer application until the policy check result is generated.

Implementations of the invention may also provide one or more of the following features. The SSO system is configured to limit access to the computer application as a function of the policy check result. The SSO system is further configured to automate the logon process of the computer application as a function of the policy check result. The SSO system is further configured to at least one of prevent access to the computer application, and shut down the computer application as a function of the policy check result. The PDP processor is further configured to receive information relating to events of interests on a plurality of computer clients. The events of interest are selected from the group consisting of attempting access to the computer application, accessing the computer application, shutting down of the computer application, and logging off of the computer application. The PDP processor is configured to identify a policy violation in response to a computer application running on another computer client.

Implementations of the invention may further provide one or more of the following features. The PDP processor is configured to store the policy check result in a log file. The PDP processor is further configured to maintain a list of active computer applications based upon the information received from the SSO system. The list of active computer applications relates to a plurality of computer clients. The PDP processor is further configured to perform the policy check using the list of active computer applications. The PDP processor is further configured to update the list of active computer applications in response to at least one of a shutdown event and a logoff event.

Various aspects of the invention may provide one or more of the following capabilities. Policies can be enforced using the combination of single sign on (SSO) software and an identity management system. Dynamic separation of duties policy can be enforced using SSO software and a policy decision point (PDP) system such as an identity management system and/or provisioning system. Policies can be enforced without requiring changes to or replacement of applications where the policy is enforced. Applications can continue to use existing security models while policies are enforced. Policies can be enforced across diverse systems. Policies can be enforced in a variety of contexts (e.g., conflicting rights and locations, conflicting rights and departments, and/or conflicting rights and time of day). Policies can be enforced at the time of use. Policies can be enforced without modification of the applications being monitored. Policies can be enforced across multiple endpoints, desktops, and/or workstations.

These and other capabilities of the invention, along with the invention itself, will be more fully understood after a review of the following figures, detailed description, and claims.

DETAILED DESCRIPTION

Embodiments of the invention provide techniques for enforcing one or more computerized policies at the time of use using an access control system. The access control system is a combination of a single sign-on (SSO) system and another computer system, such as an identity management system, that are configured to enforce DSD and other policies. The SSO system is preferably an enterprise single sign-on (ESSO) system that acts as a policy enforcement point (PEP) system, and the identity management system is preferably a provisioning system that acts as PDP system. The SSO system monitors the usage of certain applications that are initiated on and/or via the client computer such as applications that may be subject to policies such as DSD. The SSO system determines if a user attempts to use a restricted application, and provides this information to the identity management system, which performs a conflict check to determine if the user's attempted use of the application violates a policy. The identity management system provides the results of the policy check to the SSO system, which enforces the policy by, for example, allowing the user access to the requested application, indicating a conflict and providing proposed guidance for remediation, and/or by preventing access to the requested application. Preferably, the access control system is implemented such that DSD policies can be checked and enforced without requiring modification of the applications being monitored by the SSO system.

The access control system also tracks the usage of applications on a real-time, ongoing basis such that it can enforce policies across multiple computer clients. In response to detecting a successful launch or shutdown of an application by a user on any one of a plurality of computer clients, the SSO system updates a central memory containing information relating to applications that are active on the plurality of computer clients. The SSO system can track active applications locally, and/or via the identity management system. As part of the policy check performed by the identity management system, the list of active applications is consulted, thereby allowing policies to be enforced across multiple computer clients. Other embodiments are within the scope of the invention.

Figure 1:
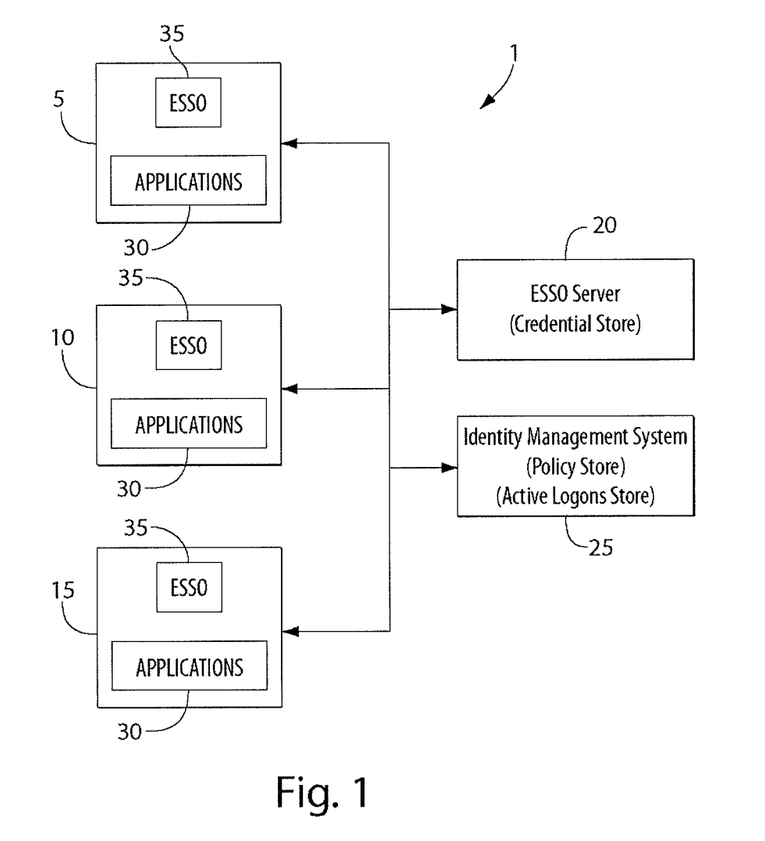
FIG. 1 is a block diagram of a computer system that can be configured to enforce access policies.

Referring to FIG. 1, a computing system 1 includes clients 5, 10, 15, an ESSO system, and an identity management system 25, and can be configured to enforce policies relating to one or more applications 30 that are executed on the clients 5, 10, 15. The computing system 1 can be configured to enforce one or more policies (e.g., DSD policies) using the ESSO system and the identity management system 25. For example, the ESSO system can be configured to track users' actions (e.g., the starting of and/or exiting from one of the applications 30) and to pass the tracked information to the identity management system 25. The identity management system 25 can be configured to perform a policy check using the information received from the ESSO system to provide results of the policy check to the ESSO system. The ESSO system can be further configured to enforce and/or implement the results of the policy check by, for example, automating a logon process and/or forcing a shutdown of application. Typical policies that can be enforced by the computing system 1 include, for example, preventing a user from simultaneously accessing multiple applications at the same time.

The clients 5, 10, 15 are preferably computers that include applications 30, and at least part of the ESSO system. For example, the clients 5, 10, 15 can be any device configured to run at least part of the ESSO system, such as a personal computer (e.g., a desktop or laptop computer), a personal digital assistant (PDA), a mobile communication device (e.g., cell phone and/or Blackberry®), a network terminal, a server, etc. The applications 30 are preferably computer applications that can be managed by the ESSO system such as Windows® applications, Apple® applications, web browser based applications, terminal emulator applications, applications accessed via a terminal emulator, and/or Java applications, although other types of applications are possible. For purposes of convenience, throughout the written description, the clients 5, 10 are described as being configured as a personal computer and a personal digital assistant, respectively, and client 15 is described as being a server which is accessible using, for example, the clients 5, 10. Although, it will be appreciated that other configurations of the clients 5, 10, 15, are possible. Furthermore, while the clients 5, 10, are shown as including applications 30, the applications 30 can be hosted elsewhere (e.g., on the client 15) and accessed via the clients 5, 10 (e.g., using terminal emulation applications and/or a web browser).

The computing system 1 can be configured to implement policies such as DSD policies. Dynamic separation of duty can prevent the use of conflicting rights in certain contexts. Most often, DSD prevents the activation of conflicting access rights simultaneously. Said another way, a user can be given and/or assigned access rights that potentially conflict, but be prevented from using the rights simultaneously. For example, assume a user is given access rights to applications A and B, and that a policy prevents applications A and B from running concurrently. If neither of the applications A and B are running, the user has the potential to use either one of the applications. If, however, the user is using application A, and attempts to invoke application B, the access and use of application B will be denied until application A is released. In this example, the use of application A must be released before B can be invoked, i.e. both cannot be used simultaneously. While the above example focuses on enforcing policies when an application is invoked, policies can be enforced at other times (e.g., preventing use of an application, rather than preventing an application from being invoked).

The computing system one can also be configured to implement policies across/among multiple clients (e.g., using an identity management system that is external to the clients). For example, by tracking active logons and logoffs across multiple clients, the identity management system 25 can prevent a user from violating a policy by using multiple clients. As an example, assume applications A and B cannot be used simultaneously according to a policy. While simultaneous use of applications A and B on a single client can be blocked by a single instance of ESSO software running on the client, applications A and B could potentially be used by the same person when each application is invoked on a different client. The identity management system can be configured to determine if a policy violation occurs across multiple clients and to report the policy violation (e.g., an attempt to run applications A and B simultaneously on different clients) to one or both clients when the identity management system detects a policy violation.

Preferably, the ESSO system includes an ESSO credential store 20 and ESSO client software 35 that can be executed on each of the clients 5, 10, 15, although other configurations are possible. In a typical embodiment, the ESSO credential store 20 is, for example, an ESSO server and/or a network folder that can be configured to store configuration data, log entries, and/or credentials for use by the ESSO system. Furthermore, in a typical embodiment, the ESSO client software 35 is an application that is executed on each of the clients 5, 10, 15, and can be configured to perform most of the functionality implemented by the ESSO system. For example, the ESSO client software 35 can be configured to track the users' actions, provide the tracked information to the identity management system 25, receive the results of policy checks from the identity management system 25, and to enforce (or facilitate) the results of the policy check performed by the identity management system 25. Although other configurations are possible. For example, the ESSO credential store 20 can be omitted, or some or all of the functionality performed by the ESSO client 35 can be performed by the ESSO credential store 20. The configuration of the ESSO system can be determined by, for example a system administrator in order to implement the computing system 1 in the most efficient manner. Thus, it will be noted that some or all of the functionality described herein that is performed by the ESSO credential store 20 can be performed by the ESSO client 35, and likewise, some or all of the functionality performed by the ESSO client 35 can be performed by the credential store 20.

Other variations of the ESSO system are also possible. For example, the ESSO client software 35 can be located elsewhere such as in a data center for applications that are virtualized (e.g., applications accessed on the client 15 via terminal emulator applications running on the clients 5, 10). Examples of remote access include virtualized applications provided by, for example, Citrix Systems, Inc. of Ft. Lauderdale, Fla. and virtualized desktops provided by, for example, VMware, of Palo Alto, Calif., Microsoft, of Redmond, Wash., Citrix Systems, and others. Furthermore, while FIG. 1 shows the ESSO credential store 20 as a separate functional block, other configurations are possible. For example, the ESSO credential store 20 can be located on one of the clients 5, 10, 15, and/or as part of the identity management system 25.

The ESSO system can be configured to monitor users' actions to determine when events of interest occur, and to track which resources are active at any given time. For example, events of interest include logging onto an operating system, attempting to start an application, starting an application, logging on to an application, shutting down an application, logging off an application, accessing a webpage, accessing a remote site via the Internet, logging off a client system, shutting down a client system, etc. By tracking which applications are currently active (e.g., including which specific users are using an application), the ESSO system can be used to prevent policy violations at, for example, the time of use (e.g., when a user attempts to logon to a controlled application). The ESSO system can be configured to manage many different types of the applications 30 such as applications based on a web browser user interface, Windows® applications, applications accessed through a terminal emulator, and/or Java based applications, although other types of applications can be monitored.

The ESSO system can be configured to impact (e.g., delay or modify) a logon process. For example, the ESSO system can be configured detect a logon event, and seize control of the logon process in order to provide user feedback and/or prevent further user interaction with the logon user interface until some or all of the desired policy checks are completed. This can be accomplished by, for example, using API calls on the desktop system to temporarily disable, hide, and/or otherwise modify the logon screens. The ESSO system can also be configured to gather and store credentials and to automate the logon process for the user using the stored credentials (e.g., including implementing automated password expiration and/or password change routines). For example, the ESSO system can be configured such that if the ESSO client 35 detects the launch of an application, the ESSO client 35 can seize control of the logon process, facilitate a policy check, retrieve credential information from the ESSO credential store 20, and automatically provide the requested logon information to the application (e.g., a username and password related to the user).

Whether or not the ESSO system automates the logon process, blocks access to the logon process, prompts the user for action, and/or does nothing at all can be configured by, for example, an administrator. For example, the ESSO system can be configured (e.g., a new event is defined within ESSO) such that it makes a policy request to the identity management system 25 after a successful application logon occurs. Alternatively, the ESSO system can be configured such that before it automatically submits any credentials to an application for logon, the ESSO system makes a policy request to the identity management system 25. For example, in both configurations, the ESSO system can be configured to request that policy checks (e.g., DSD) be performed. The ESSO system can also be configured to submit various pieces of information to the identity management system 25 as part of a policy check request such as application information and identity information for all active logons. For example, active logon information can be passed from the ESSO system to the identity management system 25 (e.g., Active Directory logon: jsmith; SAP logon: smithj; Salesforce.com logon: john.smith@mycompany.com).

Besides impacting the logon process, the ESSO system can also be configured to track successful logon and logoff events corresponding to individual users such that the ESSO system can track, at any given time, the applications that are active, and which user is using the applications. Preferably, a successful logon event occurs once valid credentials are supplied (e.g., automatically by ESSO or manually by the user) and validated by a requested application. The ESSO system can also be configured to provide application usage information to the identity management system 25. In either configuration, the ESSO system and/or the identity management system 25 can be configured to maintain a repository, such as a database stored in a memory, of which applications are currently active and which user is logged on to which application.

The ESSO system can be configured to receive responses from the identity management system 25 that indicate, for example, whether or not any policy violations are generated. The ESSO system can be configured such that, upon receiving the response to the policy check request, the ESSO system can display a warning to the user, send an alert to a third party (e.g., an administrator, and/or security personnel), drive to (e.g., check-in with) the identity management system 25 for remediation options, force logout of the application that caused the policy violation, and/or prompt the user to logout of a previously activated application. For example, remediation can include correction of access rights that are causing a policy violation (e.g., the identity management system 25 can provide updated user access permissions to the ESSO system). In order to prevent the logon process from proceeding after a policy violation has been identified, the ESSO system can be configured to control and instruct the user interface to logoff, close, and/or shutdown instead of instructing it to perform an automated logon.

The ESSO system is also configured to track logoff events as well. For example, the ESSO system can be configured to track when an application is no longer active for a specific user. The ESSO system can recognize which applications are not active, and thus are not subject to DSD policy checks. For example, assuming that a DSD violation is detected because application A is in use and application B is invoked concurrently (i.e., in violation of a policy), after application A is shutdown by the user, application B can be used without violating the policy. The ESSO system can be configured to recognize that application A is no longer in use such that application B can be logged onto without problem. Logoff events that can be tracked by the ESSO system include, for example, disconnection from an application, a "switch user" request, an application being closed, a user logging off from an application, an application shutdown, a window containing the application being shutdown, a browser window (e.g., that includes an application) being closed, system logoff, logging off of an endpoint (e.g., desktop), restarting a desktop, shutdown of the desktop, and system shutdown. Other types of logoff events can also be tracked.

The ESSO system can be configured to be controlled and/or configured by an administrator. For example, the ESSO system can be configured such that an administrator can fine-tune how the ESSO system tracks active applications. For example, the ESSO system can be configured with respect to some or all of the following aspects:

Configuring ESSO

How to recognize a successful logon event

How to recognize a successful logoff and/or shutdown event

How to handle policy warnings and errors

How to force the shutdown of one or more of the applications 30

How to report events

How to provide feedback to the user when policy checks are made.

How to recognize and interpret information from the identity management system 25

Configuring a Connection for Policy Checks

Configuring the connection interface for sending the active logon information to the identity management system 25 (e.g., configuring the protocol used to communicate between the ESSO system and the identity management system 25). This can include information such as hostname, IP address, and/or credentials. This can also include redundancy and/or load balancing information for the identity management system 25.

Configuring how to package and send active logon information to the identity management system 25 (e.g., the information used as input to the policy checks that the identity management system 25 is configured to perform).

Translating the policy violation check results returned from the identity management system 25. The results sent from the identity management system 25 can be graphically presented to the user of the clients 5, 10, 15.

The identity management system 25 is, for example, a computer system that can represent and evaluate a policy such as a provisioning system, a security system, a compliance system, a GRC system, a password management system, an ESSO web access management system, a directory service system, a strong authentication system, and/or other type of PDP system, etc. The identity management system 25 can be configured to receive information from the ESSO system. Preferably, the information represents a user's actions on one of the clients 5, 10, 15, although other information can be received and used by the identity management system 25. The identity management system 25 can be configured to use the information provided by the ESSO system to determine if the user's actions violate one or more policies, and to return a result of the policy check to the ESSO system. The identity management system 25 is also configured to track and store information relating to all active logons by a user at a given time (e.g., which applications are running and on which client).

The identity management system 25 can be configured to perform policy checks to determine if one or more policies are being violated. For example, the identity management system 25 can be configured to receive requests or other information from the ESSO system indicating that one or more policy checks should be performed. The identity management system 25 can be configured to use a list of active resources as input to the policy checks. Certain policies may use information from other sources and/or repositories as input (e.g., time of day, location information, age information, etc.) The identity management system 25 can be configured to receive the desired information from the ESSO system (and/or elsewhere) and to use it to perform a policy check. The identity management system 25 can be configured to return results of the policy checks to the ESSO system so that the ESSO system can, for example, allow or deny logon to an application. The identity management system 25 can also be configured to perform remediation and/or otherwise correct the policy violation.

The identity management system 25 can also be configured to prevent against policy violations that occur using multiple clients (e.g., policy violations across different physical systems). For example, the identity management system 25 can be configured to track events of interest (e.g., successful logon and logoff events) as reported by one or more ESSO clients 35. The events of interest tracked by the identity management system 25 can be logon and logoff events that occurred on different clients. In this manner, the identity management system 25 can prevent policy violations that are caused by actions on different clients. For example, assume that any simultaneous use of applications A and B by the same person violates a policy. Embodiments of the present invention can be configured to track and determine when application A is invoked on a first system and application B is invoked on a second client. By tracking events of interest such as logon and logoff events across multiple clients, the identity management system 25 can prevent policy violations from occurring across multiple clients.

The identity management system 25 can also be configured such that when a policy violation is detected, the identity management system 25 provides guidance that can be used by the ESSO system to remediate the violation. For example, a DSD policy can be defined for applications A and B indicating the both cannot be active at the same time. In the event that a user attempted to start application B while application A was active, the identity management system 25 could provide remediation guidance that causes, for example, application A to be shut down in order to allow application B to run. The ESSO system can be configured to receive the guidance from the identity management system 25, and to prompt the user to request that the user shuts down application A, or the ESSO system can automatically cause application A to shut down (e.g. by choosing the exit command from the file menu of a typical Windows application).

Figure 2:
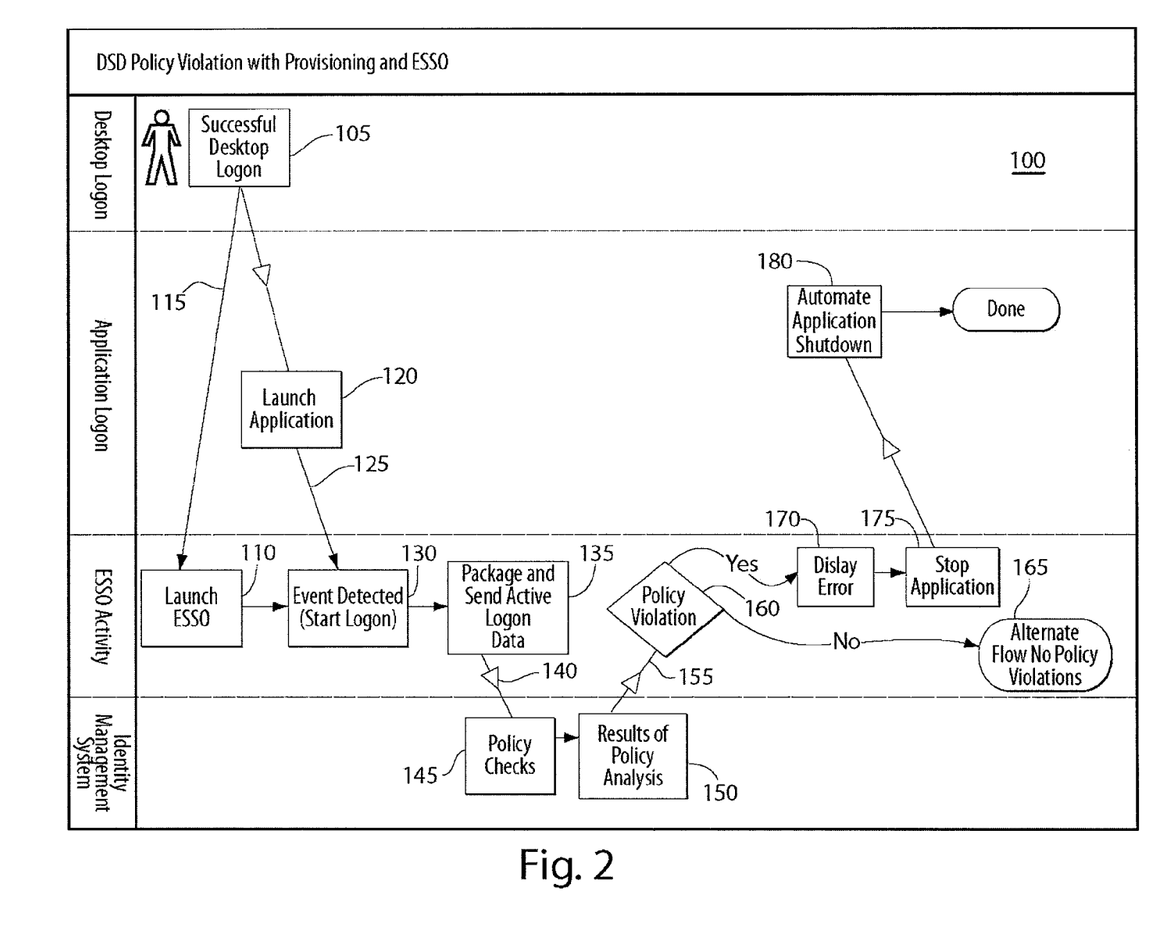
FIG. 2 is a flowchart of a process for managing computer access.

The identity management system 25 can be configured to be controlled and/or configured by an administrator. For example, the identity management system 25 can be configured with respect to some or all of the following aspects:

- Defining policies (e.g., DSD policies) to be checked on behalf of the ESSO system.
- Translating data received from the ESSO system into a format usable by the identity management system 25 and translating the received information into the input information desired to perform the policy check(s).
- Translating the results of the policy check(s) to a format that is consumable by the ESSO system.
- Storing and/or persisting active application usage by tracking logon and/or logoff information In operation, referring to FIG. 2, a process 100 for preventing policy violations using the computing system 1, includes the stages shown. The process 100, however, is exemplary only and not limiting. The process 100 may be altered, e.g., by having stages added, removed, altered, or rearranged. Furthermore, while the process 100 assumes that the event of interest is the launching of an application, other events of interest can also be monitored.

At stage 105 a user performs a successful client logon (e.g., by logging on to Windows®) and/or network logon using, for example, the clients 5, 10, 15. For convenience, it will be assumed throughout the description of the process 100 that the user is using the client 5, although the user can also use the clients 10, 15.

At stage 110, ESSO client software 35 is started and a unique identifier (UID) of the user is passed to the ESSO system (e.g., arrow 115) by, for example, an operating system of the client 5. Preferably, the ESSO client software 35 is started in response to a successful client logon and/or network logon, although all or part of the ESSO system can be configured to start at other times as well (e.g., at power-up of the clients 5).

At stage 120, the application 30 is launched by the user and the ESSO system detects the launch of the application (e.g., arrow 125). The application 30 can be executed on the client 5, and/or can be executed elsewhere. For example, the ESSO system can detect when the user accesses a remote application using a terminal emulator. Other types of events can also be detected.

At stage 130, the ESSO system can be configured such that the application launch triggers a START_LOGON event in the ESSO system. The START_LOGON event is preferably associated with a resource type (e.g., typically an account) associated with the target (e.g., the system or application that is requesting credentials such as an Active Directory domain, a Unix server, a SQL database, etc.). Other types of events can also be triggered in response to an application launch.

At stage 135, the ESSO system can be configured to gather information that can be used as input for the one or more policy checks. Information collected by the ESSO system can include information such as a unique resource identifier (e.g., an account name), an application unique identifier (e.g., of the application that the user is attempting to logon to), and identifiers of all active logons. The ESSO system can be configured to send the gathered information to the identity management system (e.g., arrow 140). The ESSO system can be configured such that that it disables, hides, or otherwise alters the user interface of the newly launched application pending results from the identity management system (e.g. to prevent the user from manually logging on). The ESSO system can also be configured to display feedback to the user (e.g., a wait cursor and/or information dialog) indicating that one or more policy checks are being made. The ESSO system can also be configured such that it can provide user feedback (e.g., displaying a message to a user) when, for example, processing is anticipated to take a long time to complete.

At stage 145, the identity management system 25 can be configured to perform policy checks such as DSD policy checks, although other types of policy checks can also be performed. Some embodiments of the computing system 1 can be configured such that a policy check is made each time an application is launched, even if the launched application is the only active application, which can be useful in cases where a user is logged on to multiple clients and/or if the policy is defined in terms of only a single client. The identity management system 25 can be configured to use the information provided by the ESSO system as input to the one or more policy checks that are preformed. For example, the policies can verify that no SoD rules are violated. In general, during stage 145 any policy can be checked and SoD is only one example of policy. For example, another policy could be configured to restrict logon based on time of day.

The identity management system 25 can also be configured to request and/or use information from multiple sources to perform the policy check. For example, the identity management system 25 can use active logon information from the ESSO system, and/or active logon information tracked by the identity management system 25. The identity management system 25 can also be configured to retrieve information from other systems (e.g., that ESSO is not aware of) to use as input to the policy decision. For example, the identity management system 25 can be configured to query a database that includes the current employment status (e.g., active, terminated, etc.) of a user.

At stage 150, the results of the policy analyses are preferably packaged in a format compatible with the ESSO system (e.g., in a form expected by the ESSO system). Guidance can also be packaged with the results that are provided to the ESSO system. For example, guidance can be used to suggest remediation for policy violations that are found (e.g., forcing a shutdown of application A in order to start application B). The identity management system 25 can be configured to return the results to the ESSO system (e.g., arrow 155). The identity management system 25 can also be configured such that it tracks all active logons (e.g. using information provided from multiple clients), and such that it recognizes policy violations for a user across all systems currently in use by that user.

The identity management system 25 can optionally be configured to track and/or log policy violations that are returned in the responses provided to the ESSO system (e.g., over a redefined period of time). For example, an audit history of policy violations can be useful for generating reports, for historical reporting, and/or for forensic analysis. Audit histories within the identity management system 25 can also be used to check and verify that the computing system 1 is operating in compliance with all desired regulations.

At stage 160, the ESSO system can be configured to receive the results of the one or more policy checks from the identity management system 25 and to determine how to proceed, including how to handle policy violations. If no policy violation occurred, the process 100 proceeds to stage 165, otherwise, the process 100 continues to stage 170. The ESSO system is also configured to receive any guidance sent by the identity management system 25 and to use the guidance to enforce the policy.

At stage 165, the ESSO system can be configured to allow the user to complete the action that initially triggered the policy check. For example, if policy check was triggered by the user attempting to logon to an application, the ESSO system can be configured to enable the user interface of the application that the user is attempting to logon to, and can optionally remove, clear, and/or hide user feedback elements (e.g., a wait cursor). Stage 165 is described in greater detail with respect to FIG. 3.

At stage 170, the ESSO system can be configured to report the policy violation to the user. The ESSO system can report the policy violation to the user by, for example, displaying a short or detailed description of the policy violation to the user. The ESSO system can also be configured such that the user is given no explanation. The ESSO system can be configured to require the user to acknowledge a policy violation and/or can be configured to display the policy violation for a predetermined period of time.

At stage 175, the ESSO system can be configured to cause the application requested by the user to shutdown by, for example, sending a command to the operating system of the client 5 (e.g., at stage 180). Thus, in this manner, a potential DSD policy violation can be prevented at the point where the user attempted to use a resource that violated a policy. Options available to the ESSO system in response to a policy violation include, for example, causing the requested application to shutdown, causing a window associated with the application to close, causing a browser window associated with the application to close, causing the application to close (even when the application remains running), causing the application to switch to a new user (even when the application remains running), causing a window associated with the application to close when the application remains running (e.g., in the case of a terminal emulator), causing a button in a webpage to be clicked, and causing an entire system shutdown. Other logoff and/or shutdown events can also be caused.

Figure 3:
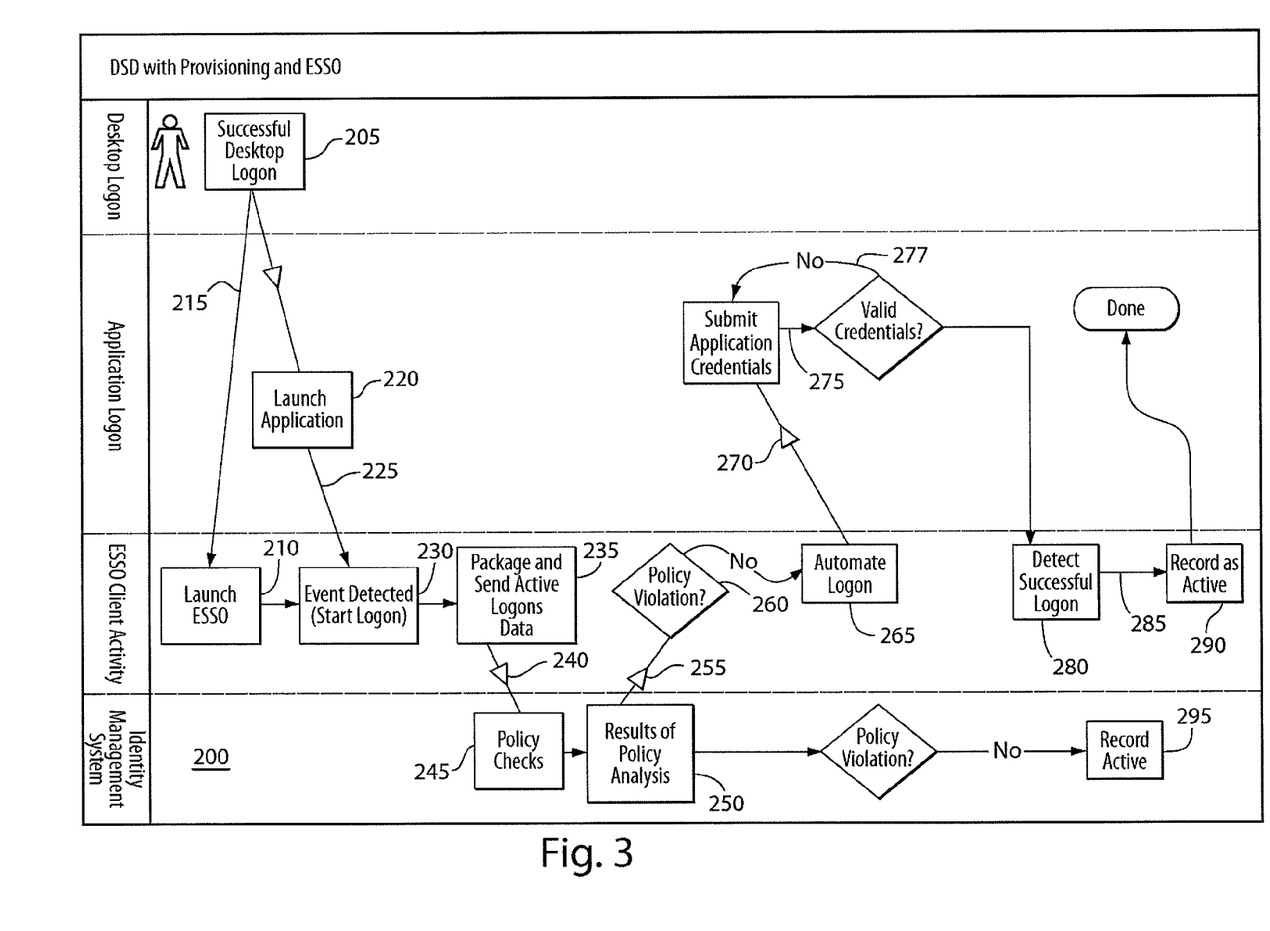
FIG. 3 is a flowchart of a process for managing computer access.

In operation, referring to FIG. 3, a process 200 for managing a logon process to make policy decisions and prevent policy violations, such as DSD, includes the stages shown. The process 200, however, is exemplary only and not limiting. The process 200 may be altered, e.g., by having stages added, removed, altered, or rearranged. Stages 205, 210, 220, 230, 235, 245, 250, and 260 are preferably substantially similar to that described above with respect to stages 105, 110, 120, 130, 135, 145, 150, and 160, respectively. Similarly, the information provided in the communications represented by arrows 215, 225, 240, and 255 is preferably substantially similar to the information provided by the communications represented by arrows 115, 125, 140, and 155, respectively.

At stage 260, the ESSO system can be configured to receive the results of the one or more policy checks from the identity management system 25 and to determine how to proceed, including how to handle policy violations. If no policy violation occurred, the process 200 proceeds to stage 265, otherwise, the process 200 continues to stage 170 of the process 100, as described more with respect to FIG. 2.

At stage 265, the ESSO system can be configured to automate the logon process (e.g., shown by arrows 270, 275). For example, the ESSO system can be configured to retrieve previously stored logon credentials (e.g., from a memory such as the ESSO credential store 20) and to provide the retrieved credentials to the application to automate the logon process. The ESSO system can also be configured to handle failed logons, password expiration warnings, and other errors as part of its traditional operation (e.g., arrow 277).

At stage 280, the ESSO system can be configured to detect a successful logon to the requested application and to indicate that a successful logon has occurred (e.g., arrow 285). The ESSO system itself can track the successful logons, or alternatively, the ESSO system can be configured to provide notice of the successful logon to a third party (e.g., the identity management system 25).

At stage 290, the ESSO system can be configured to record an account UID, an application UID, and a resource type as active (e.g., arrow 285). Preferably, at this point, the requested application is ready for traditional operation, although stages 280, 285, and 290 can occur in the background as the user is using the requested application.

At optional stage 295, the identity management system 25 can be configured to record the active logon, which can give the identity management system 25 the ability to prevent policy violations that are attempted from different ESSO operating system images (e.g., logon attempts on more than one computer client). The identity management system 25 can be configured to store the active logon information in, for example, a memory (e.g., RAM, ROM, hard drive, optical disc, tape, etc.).

Figure 4:
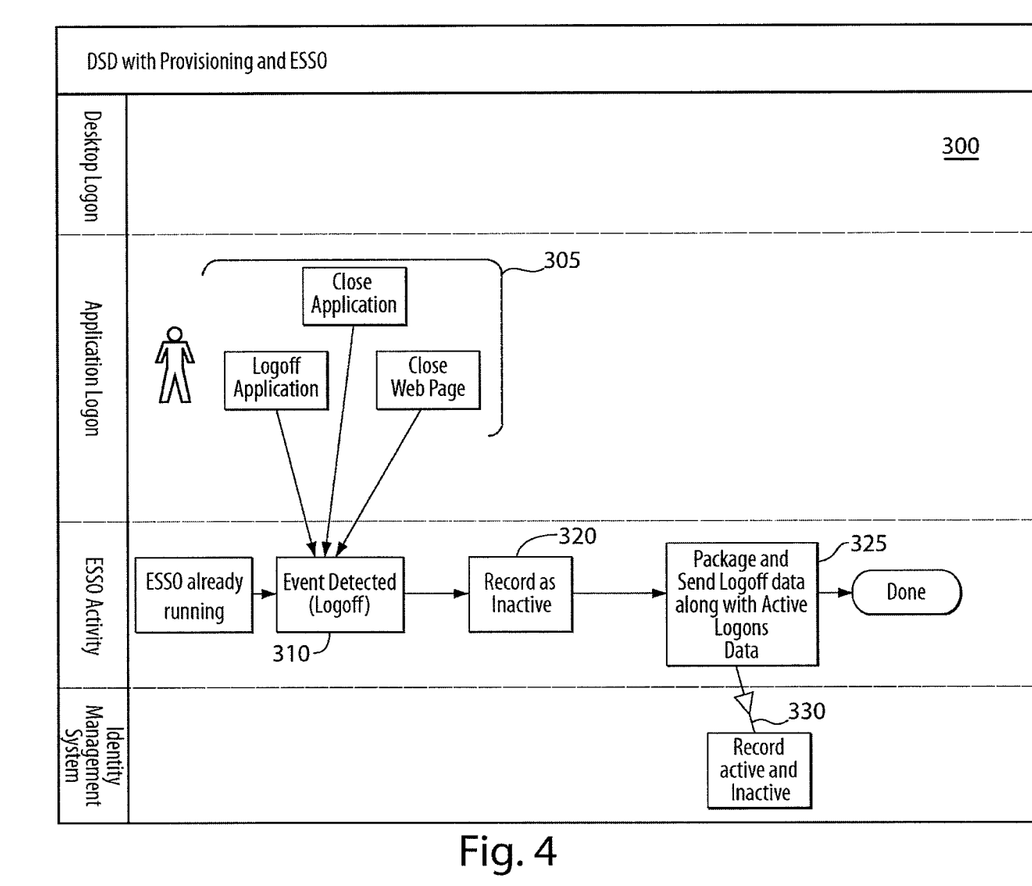
FIG. 4 is a flowchart of a process for tracking user actions on a computer system.

In operation, referring to FIG. 4, a process 300 for managing a logoff process includes the stages shown. The process 300, however, is exemplary only and not limiting. The process 300 may be altered, e.g., by having stages added, removed, altered, or rearranged. The process 300 can be used when control of an application is no longer active, such as when a user shuts down, relinquishes control over an application, and/or logs off of an application, At stage 305 a shutdown event occurs signaling that a particular user account and/or application is not longer active (e.g., no longer in use). Some examples shutdown events are shutting down an application, closing a window, closing a browser window, logoff of the application (even when the application remains running), switching to a new user (even when the application remains running), closing a window when the application remains running (e.g., when using a terminal emulator), clicking a button in a web page, clicking a link in a web page, and system shutdown. Other shutdown events can also be detected.

At stage 310, the ESSO system can be configured to detect the shutdown event by, for example, receiving a notification from an operating system running on the client that the shutdown event has occurred.

At stage 320, in response to detecting the shutdown event, the ESSO system can be configured to remove the user account information from the active list such that future policy checks may no longer consider the application as active.

At stage 325, the ESSO system can be optionally be configured to package the list of active accounts along with information about the shutdown event and to pass this information to the identity management system 25 (e.g., arrow 330). In this manner, the identity management system 25 can track and/or be aware of active logons in order to prevent policy violations that span different clients (e.g., when a user attempts a policy violation using different computers).

Figure 5:
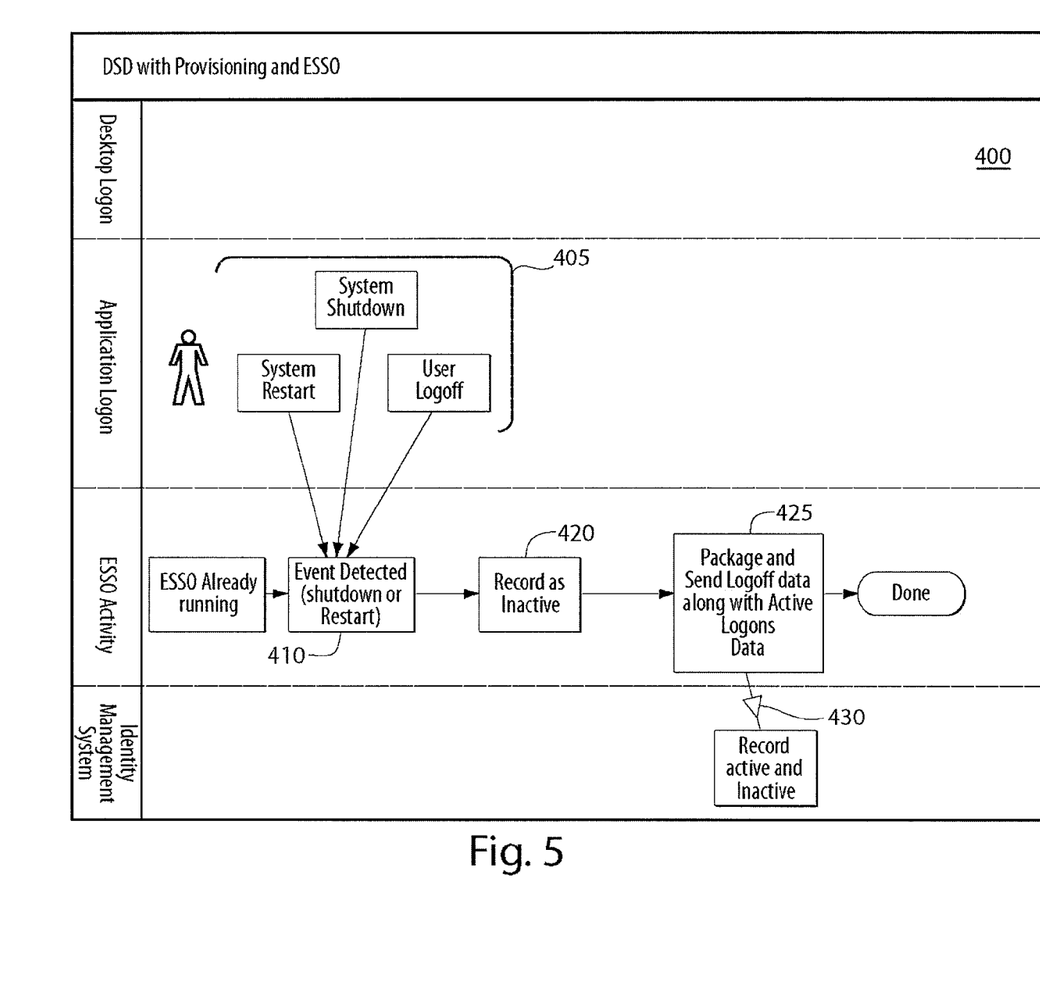
FIG. 5 is a flowchart of a process for tracking user actions on a computer system.

In operation, referring to FIG. 5, a process 400 for managing an endpoint shutdown, restart, or reboot process includes the stages shown. The process 400, however, is exemplary only and not limiting. The process 400 may be altered, e.g., by having stages added, removed, altered, or rearranged. The process 400 can be used when use of the desktop or endpoint (e.g. that is being used by a user) is relinquished through actions such as shutdown or logoff.

At stage 405, a logoff and/or shutdown event occurs, which can indicate that an endpoint (e.g., a desktop) and/or user is no longer active (e.g., no longer in use). Some examples of logoff and/or shutdown events are shutting down a system, restarting or rebooting a system, and logging off of a desktop user.

At stage 410, the ESSO system can be configured to detect the desktop logoff, restart, and/or shutdown event by, for example, receiving a notification from an operating system running on the client that the desktop logoff, restart, and/or shutdown event has occurred.

At stage 420, in response to detecting the desktop logoff, restart, and/or shutdown event, the ESSO system can be configured to remove user account information for all running applications from the active list such that future policy checks may no longer consider the applications on the system for the user as active At stage 425, the ESSO system can be optionally configured to package the list of active accounts along with information about the logoff and/or shutdown event and to pass this information to the identity management system 25 (e.g., arrow 430). In this manner, the identity management system 25 can track and/or be aware of active application logons in order to prevent policy violations that span different clients (e.g., when a user attempts a policy violation using different computers).

Figure 6:
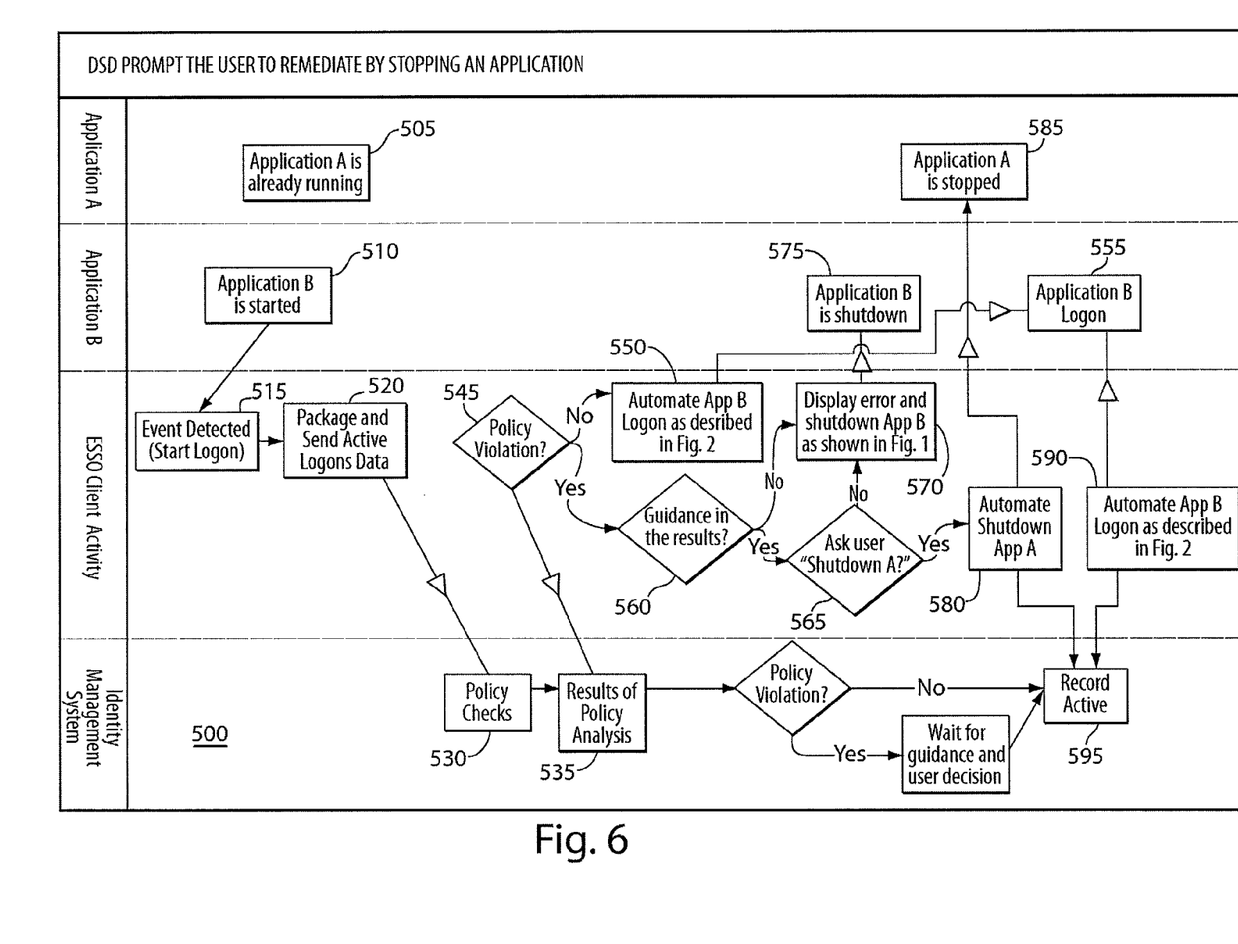
FIG. 6 is a flowchart of a process for managing computer access.

In operation, referring to FIG. 6, a process 500 for remediating DSD policy violations includes the stages shown. The process 500, however, is exemplary only and not limiting. The process 500 may be altered, e.g., by having stages added, removed, altered, or rearranged. The process 500 can be used when control of an application (e.g. that is being used by a user) is relinquished through confirmation from the end user. Furthermore, the process 500 is a variation of the process 100 that can include guidance for remediating a policy violation. Additionally, while the process 500 assumes that the application A is already running, process 500 can apply to other applications as well.

At stage 505, application A is running and has already been logged onto.

At stage 510, the user starts (or attempts to start) application B, although other types of events can be detected as described herein.

At stage 515, the ESSO system can be configured to detect an event of interest similar to that discussed above with respect to stage 130 of the process 100.

At stage 520, the ESSO system can be configured to gather information that can be used as input for one or more of the policy checks, similar to that described above with respect to stage 135 of the process 100.

At stage 530, the identity management system 25 can be configured to perform policy checks in a manner similar to that described above with respect to stage 145 of the process 100.

At stage 535, the identity management system 25 can be configured to send a message to the ESSO system that includes, for example, the results of the policy check and/or guidance on remediation methods in a manner similar to that described above with respect to stage 150 of the process 100.

At stage 545, the ESSO system can be configured to receive and process the information from the identity management system 25 in a manner similar to that described above with respect to stage 160 of the process 100.

At stage 550 and 555, if no policy violations are contained in the results, the application is allowed to start, and the ESSO system optionally automates the logon process (e.g., as described in process 200 for a successful logon).

At stage 560, the ESSO system can be configured to determine if the information received from the identity management system 25 includes guidance for remediation.

At stage 565, the ESSO system receives and processes the guidance that was received from the identity management system 25. For example, the ESSO system can be configured to prompt the user to remediate the policy violation based upon the guidance received from the identity management system 25. In this example, the prompt displayed to the user would ask the user to shut down application A. If the user agrees to shut down application A, the process 500 proceeds to stage 580, otherwise the process 500 proceeds to stage 570. Other types of remediation are also possible in response to a policy violation.

At stage 570, if no guidance was received from the identity management system 25, the ESSO system follows a predetermined default procedure such as displaying an error and causing application B to shut down.

At stage 580 the user chooses to accept the guidance and application A is instructed to shut down by the ESSO software at stage 585.

At stage 590 application B is allowed to start and logon is optionally automated by the ESSO system. Preferably, the automation of the logon of application B does not occur until application A successfully shuts down.

At optional stage 595, the identity management system 25 can be configured to receive and record the active logon information in a manner similar to that described with respect to stage 295 of the process 200. In this example, application A is recorded as no longer active, and application B is recorded as active.

Other embodiments are within the scope and spirit of the invention.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device or in a propagated signal), for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Further, while the description above refers to the invention, the description may include more than one invention.

What is claimed is:

1. A method for enforcing policies used with a computer client, the method comprising:
    receiving, at policy decision point (PDP) processor, information from an enterprise single sign-on (ESSO) system indicating an occurrence of an event of interest of a client application running on the computer client;
    performing, using the PDP processor and the information from the ESSO system, a policy check in response to the occurrence of the event of interest, wherein a policy check result is generated; and
    providing the generated policy check result to a policy enforcement point (PEP), the PEP being the ESSO system configured for policy enforcement at the computer client, wherein the ESSO system forces a shutdown of the client application running on the computer client and the enforcement is transparent to the client application.

2. The method of claim 1 wherein performing the policy check includes performing a separation of duty policy check.

3. The method of claim 2 wherein the separation of duty policy check is a dynamic separation of duty policy check.

4. The method of claim 1 wherein the event of interest is selected from the group consisting of launching a computer application, logging onto the computer application, attempting to start the computer application, accessing a webpage, and accessing a remote server.

5. The method of claim 1 further comprising limiting access to a computer application until the policy check result is generated.

6. The method of claim 1 further comprising limiting access to a computer application as a function of the policy check result.

7. The method of claim 1 further comprising automating a logon process of a computer application as a function of the policy check result.

8. The method of claim 1 further comprising receiving, at the PDP processor, information relating to events of interest on a plurality of computer clients.

9. The method of claim 8 wherein the events of interest are selected from the group consisting of attempting access to a computer application, accessing the computer application, shutting down of the computer application, and logging off of the computer application.

10. The method of claim 9 further comprising preventing access to a computer application running on a first computer client in response to a computer application running on a second computer client.

11. The method of claim 1 further comprising storing the policy check result in a log file.

12. The method of claim 1 further comprising maintaining a list of active computer applications based upon the information received from the ESSO system.

13. The method of claim 12 wherein the list of active computer applications relates to a plurality of computer clients.

14. The method of claim 13 wherein the performing the policy check is performed using the list of active computer applications.

15. The method of claim 12 further comprising updating the list of active computer applications in response to at least one of a shutdown event and a logoff event.

16. A policy enforcement system for use with a computer client configured to execute computer applications, the system comprising:
   a first hardware processor coupled to memory configured as an enterprise single sign-on (ESSO) system that is configured to monitor the computer client for an occurrence of an event of interest of a running client application;
   a second hardware processor coupled to memory configured as a policy decision point (PDP) in communication with the ESSO system and configured to:
      receive from the processor configured as an ESSO system an indication of the occurrence of the event of interest;
      perform a policy check in response to the occurrence of the event of interest;
      provide a policy check result to the processor configured as an ESSO system; and
   wherein the processor configured as an ESSO system is further configured to manage the computer application as a function of the policy check result wherein the ESSO system forces a shutdown of the client application running on the computer client and forcing the shutdown is transparent to the client application.

17. The system of claim 16 wherein the processor configured as a PDP is configured to perform a separation of duty policy check.

18. The system of claim 17 wherein the separation of duty policy check is a dynamic separation of duty policy check.

19. The system of claim 16 wherein the event of interest is selected from the group consisting of launching a computer application, logging onto the computer application, attempting to start the computer application, accessing a webpage, and accessing a remote server.

20. The system of claim 16 wherein the processor configured as an ESSO system is configured to limit access to the computer application until the policy check result is generated.

21. The system of claim 16 wherein the processor configured as an ESSO system is further configured to automate the logon process of the computer application as a function of the policy check result.

22. The system of claim 16 wherein the processor configured as a PDP processor is further configured to receive information relating to events of interests on a plurality of computer clients.

23. The system of claim 22 wherein the events of interest are selected from the group consisting of attempting access to the computer application, accessing the computer application, shutting down of the computer application, and logging off of the computer application.

24. The system of claim 16 wherein the processor configured as a PDP processor is configured to identify a policy violation in response to a computer application running on another computer client.

25. The system of claim 16 wherein the processor configured as a PDP processor is configured to store the policy check result in a log file.

26. The system of claim 16 wherein the processor configured as a PDP processor is further configured to maintain a list of active computer applications based upon the information received from the ESSO system.

27. The system of claim 26 wherein the list of active computer applications relates to a plurality of computer clients.

28. The system of claim 27 wherein the processor configured as a PDP processor is further configured to perform the policy check using the list of active computer applications.

29. The system of claim 26 wherein the processor configured as a PDP processor is further configured to update the list of active computer applications in response to at least one of a shutdown event and a logoff event.

30. A method for enforcing policies used with a plurality of computer clients, the method comprising:
   receiving, at policy decision point (PDP) processor, information from an enterprise single sign-on (ESSO) system indicating an occurrence of an event of interest of a first client application on one of the plurality of computer clients, the event associated with a user identity, wherein the PDP processor is a hardware processor coupled to memory;
   performing, using the PDP processor and the information from the ESSO system, a dynamic segregation of duty policy check, the policy check including checking a list indicating currently active applications associated with the user identity, wherein a policy check result is generated, the policy check being performed in response to the occurrence of the event of interest; and
   providing the generated policy check result to the ESSO system for policy enforcement at one or more of the plurality of computer clients, the enforcement being performed by the ESSO system and includes forcing a shutdown of at least one of the currently active applications, the enforcement being transparent to the first client application and the currently active applications.

* * * * *